March 28, 1961   F. C. FLOWERS   2,977,248
GASKET AND METHOD OF MAKING SAME
Filed Oct. 15, 1958
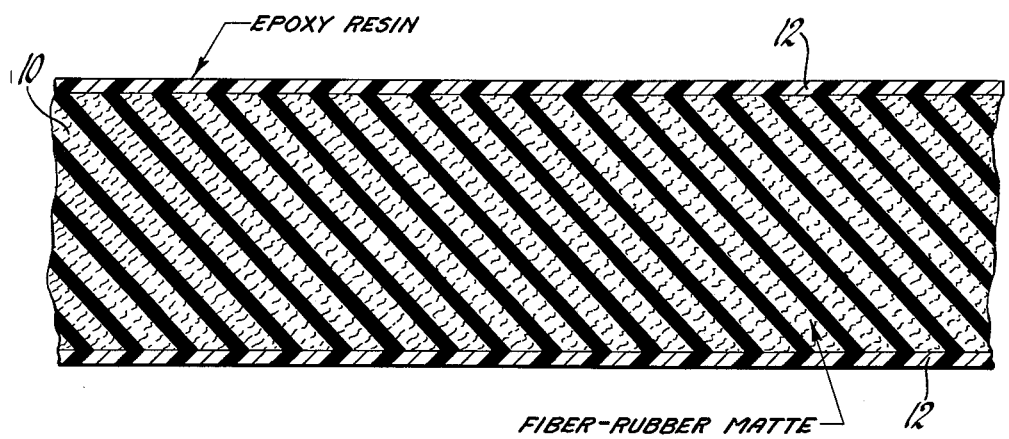
INVENTOR.
Fred C. Flowers
BY
Peter T. Kozak
ATTORNEY

United States Patent Office 2,977,248
Patented Mar. 28, 1961

2,977,248

GASKET AND METHOD OF MAKING SAME

Fred C. Flowers, Indianapolis, Ind., assignor to General Motors Corporation, Detroit, Mich., a corporation of Delaware Filed Oct. 15, 1958, Ser. No. 767,427

8 Claims. (Cl. 117—126)

This invention relates to gaskets and more particularly to gaskets for use in heavy-duty motor vehicle transmissions such as are used in ordinance equipment and the like.

Gaskets used in heavy-duty transmissions are subjected to relatively high temperatures and pressures, high velocity oil streams and high torque loads when the gasket is used in a torque carrying split line. The high oil pressures promote blowout, leakage and wicking of the gasket materials. The high temperatures promote separation of the gasket material components, brittleness and deterioration of the gasket material. The high oil velocity streams which impinge on the gasket surfaces cause erosion failures which allow fragmentary gasket particles to be circulated through the hydraulic system. The high torque loads cause shearing of the gasket material when used in a torque carrying split line.

The basic object of this invention is to provide an improved gasket for use in heavy-duty transmission apparatus having improved sealability for resisting blowout, surface leakage and wicking due to high oil pressures, having a high resistance to high oil temperatures and high velocity oil streams and having a high sealability and coefficient of friction for resisting shear when the gasket is used in a high torque carrying split line. It is a further object of the invention to provide a method for forming the aforementioned improved gasket.

These and other objects are accomplished by first thoroughly mixing a suitable quantity of heat-resistant fibrous material with a plastic mass of chemical-resistant rubber cement, sheeting the material to a desired thickness and curing the cement, and subsequently sealing the fibers exposed at the surface of the sheet material with an epoxy resin by applying an uncured liquid coating of epoxy resin of a predetermined thickness to the surfaces of the cured sheet and then curing the resin at room temperatures or relatively low temperature conditions. In a preferred embodiment of the invention, the fibrous filler material consists of short asbestos fibers in a proportion of 55% to 65% by weight of the unsealed gasket, and the binder consists of about 35% to 45% by weight of a butadiene-acrylonitrile copolymer rubber formulation wherein the copolymer consists of about 75% butadiene and correspondingly 25% acrylonitrile.

Other objects and advantages of the invention will more fully appear from the following detailed description of a preferred embodiment, reference being made to the accompanying drawing which is a greatly enlarged fragmentary cross-sectional view of a gasket.

In the manufacture of the gasket of the present invention, a gasket core is first provided which is resilient and has exceptional resistance to deterioration due to heat, oil and other deleterious substances normally found in transmission oils. To this end, asbestos fibers are provided preferably having an average length of about two millimeters and an average cross-sectional thickness of about ten microns. About 60 parts by weight of the asbestos fibers are then thoroughly admixed with about 40 parts of a plastic mixture of the following composition by weight:

100 parts butadiene-acrylonitrile copolymer (about 75% butadiene and about 25% acrylonitrile)
5 parts zinc oxide
1 part stearic acid
15 parts mineral oil
25 parts carbon black
1.5 parts sulfur
1.5 parts Altax (benzothiazyl disulfide)

The above composition is preferably prepared as a plastic extrudable mass by first dissolving or softening the butadiene-acrylonitrile copolymer rubber in a solvent such as toluene or xylene and then mixing the swelled rubber in a suitable mixture with the remaining ingredients and the asbestos fiber until a homogeneous mass is obtained. The homogeneous plastic mixture thus formed is extruded or rolled into a sheet 10 having approximately the thickness of the desired gasket. The sheet is then cured in an autoclave for about 30 minutes at about 300° F.

The resulting sheet is a resilient, tough material resistant to oil and heat, having a multitude of exposed asbestos portions adjacent the surfaces of the sheet. The exposed asbestos fibers are then sealed by coating the sheet with a thin layer 12 of an epoxy resin, preferably about 0.005 inch thick. This is preferably accomplished by rolling a liquid curable epoxy resin onto the surfaces of the sheet and permitting the resin to cure, preferably at room or relatively low temperatures not in excess of about 212° F. The sheet is then cut to the desired shape of the gasket.

Although it is preferred to use proportions of 60% by weight of asbestos fiber and 40% by weight of the rubber binder, highly satisfactory gaskets are obtained in using 55% to 65% of the asbestos fiber and correspondingly 35% to 45% of the butadiene-acrylonitrile rubber cement formulation. The butadiene-acrylonitrile formulation set forth above is intended to be illustrative since it will be readily apparent to those skilled in the art that various formulations including various accelerators, plasticizers, antioxidants and the like, well known in the art, may be used.

The term "epoxy resin" as used in the specification is intended to refer to polyepoxide containing two or more epoxide groups per molecule having the general formula:

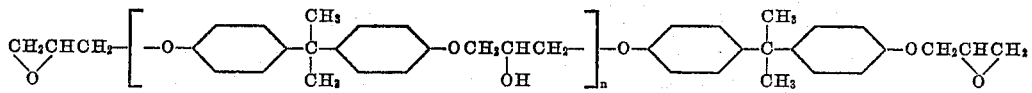

wherein the $n$ has a value from about 0.25 to 2.0. A specific illustration of the epoxy resin contemplated is a low viscosity resin formed by the reaction of epichlorohydrin and bisphenol A to produce a resin monomer or polymer of relatively low viscosity which may be readily applied to the gasket surface as a thin layer. A polyamine hardening agent such as diethylene tetramine is added in suitable amounts to the liquid resin just prior to its application to the gasket core. If necessary, the viscosity of the resin may be controlled by the addition of a solvent such as ethylmethyl ketone. After applying the epoxy resin to the sheet 10, the curable liquid epoxy resin including the amine hardener is applied to the sheet as described and permitted to cure at temperatures from room temperature to about 212° F. whereby the resin coating is hardened and bonded securely to the gasket core.

The resulting gasket has a combination of properties making it particularly useful in connection with heavy-duty transmission systems which operate at relatively high temperatures and pressures, involve high velocity oil flow rates and which involve considerable shear on the gasket when it is used in a torque carrying split line. Very importantly the gasket has a high resistance to the small quantity of moisture normally found in transmission oils. The epoxy resin seal provides the gasket with several exceptional properties. It provides the gasket with exceptional resistance to heat and the solvent effect of oils. It seals the asbestos fibers which are otherwise exposed at the surface of the gasket, thereby preventing the moisture in the hydraulic oils from swelling the fibers and thereby promoting erosion. In the absence of the epoxy resin seal, the water would swell the asbestos fibers thereby promoting the erosion of the gasket by the high velocity oil flow. The epoxy resin coating provides the gasket with an unexpectedly high sealability. Although other fibrous materials could be used in the gasket with improved results, optimum performance requires the use of asbestos fibers which have a minimum tendency to absorb moisture and swell.

Optimum results are obtained with an epoxy resin coating of about 0.005 inch. Epoxy resin coatings beyond 0.15 inch exhibit markedly inferior properties.

The epoxy resin coating also provides the gasket with a relatively high coefficient of friction and a high sealability so as to provide the gasket with excellent properties for use in a high torque carrying split line.

It is to be understood that although the invention has been described with specific reference to a particular embodiment, it is to be understood that changes and alterations therein may be made which are within the full scope of the invention as defined in the appended claims.

I claim:

1. A method of forming a heat, chemical and solvent resistant gasket which comprises forming a plastic mixture of a fibrous material and rubbery binder to a shape of suitable width and thickness, curing the rubbery binder, coating the gasket with a layer of epoxy resin not in excess of .015 inch whereby the exposed fibrous material is sealed and curing the epoxy resin.

2. A method of forming a heat, chemical and solvent resistant gasket which comprises mixing a major proportion of asbestos fibers with a plasticized, curable, chemical resistant rubbery binder to form a plastic mixture, forming said mixture to a strip of suitable thickness, curing the rubbery binder, coating the strip with a layer of epoxy resin not in excess of .015 inch, whereby the fiber ends at the surface of the gasket material are sealed and curing the epoxy resin.

3. A method of forming a heat, chemical and solvent resistant gasket which comprises mixing asbestos fibers with a plasticized, chemical resistant rubbery binder in proportions of 55% to 65% by weight of the former to 35% to 45% by weight of the latter to form a plastic mixture, forming said mixture to a strip of suitable thickness to approximately the final thickness of the desired gasket, coating said strip with an epoxy resin to a thickness of approximately .005 inch, whereby the asbestos fibers exposed at the surface of the gasket material are sealed and curing the epoxy resin.

4. A method of forming a heat, chemical and solvent resistant gasket which comprises approximately 60% by weight of short asbestos fibers and 40% by weight of a plasticized butadiene-acrylonitrile polymeric binder to form a plastic mixture, forming said mixture to a sheet of approximately the final thickness of the desired gasket, curing the rubbery binder and coating the strip with a layer of epoxy resin of approximately .005 inch in thickness and curing the epoxy resin.

5. A flexible gasket material comprising a rubberized fibrous sheet having fiber portions exposed at the sheet surface sealed with an epoxy resin, said fibrous sheet consisting essentially of about 55% to 65% by weight of mineral fibers and about 35% to 45% by weight of a cured heat and solvent resistant or rubbery binder.

6. A flexible gasket material comprising a rubberized fibrous sheet coated with an epoxy resin.

7. A flexible gasket material comprising a rubberized fibrous sheet having fiber portions exposed at the sheet surface sealed with a coating of an epoxy resin, said fibrous sheet consisting essentially of about 55% to 65% by weight of asbestos fibers and about 35% to 45% by weight of a butadiene-acrylonitrile copolymer rubbery binder, said epoxy resin coating having a thickness not in excess of 0.015 inch.

8. A flexible gasket material comprising a rubberized fibrous sheet having fiber portions exposed in the sheet surface sealed by an epoxy resin coating, said fibrous sheet consisting essentially of about 60% by weight of asbestos fibers and about 40% by weight of a butadiene-acrylonitrile copolymer rubbery binder, said epoxy resin coating having a thickness of about 0.005 inch.

References Cited in the file of this patent

UNITED STATES PATENTS

| | | |
|---|---|---|
| 2,393,953 | Bacon | Feb. 5, 1946 |
| 2,459,721 | Poltorak | Jan. 18, 1949 |
| 2,597,976 | Cousins | May 27, 1952 |
| 2,830,721 | Pinsky et al. | Apr. 15, 1958 |